(12) United States Patent
Hugon et al.

(10) Patent No.: US 6,220,421 B1
(45) Date of Patent: Apr. 24, 2001

(54) TRANSFER DEVICE AND A CONVEYOR FITTED WITH SUCH A DEVICE

(75) Inventors: Jean Hugon; Jean-Pierre Semain, both of Lyons (FR)

(73) Assignee: Gallet Systemes Automatises, Venissieux (FR)

( * ) Notice: Subject to any disclaimer, the term of this patent is extended or adjusted under 35 U.S.C. 154(b) by 0 days.

(21) Appl. No.: 09/219,739

(22) Filed: Dec. 22, 1998

(30) Foreign Application Priority Data

Dec. 22, 1997 (FR) .................................................. 97 16590

(51) Int. Cl.⁷ ............................ B65G 47/10; B65G 25/00
(52) U.S. Cl. ................................... 198/370.07; 198/468.1
(58) Field of Search ............................ 198/370.07, 408.1, 198/739, 746

(56) References Cited

U.S. PATENT DOCUMENTS 3,045,801 * 7/1962 Graybeal ......................... 198/370.07
5,010,998 * 4/1991 MacMillan ...................... 198/370.07
5,217,104 * 6/1993 Pelletier .......................... 198/370.07
5,464,088 * 11/1995 Koerber ........................... 198/370.07

FOREIGN PATENT DOCUMENTS 27 56 552   6/1979 (DE) .............................. B65B/47/74
2.056.305   4/1971 (FR) ................................ B23Q/5/00

* cited by examiner

Primary Examiner—Robert P. Olszewski
Assistant Examiner—Bryan Jaketic
(74) Attorney, Agent, or Firm—Nawrocki, Rooney & Sivertson, P.A.

(57) ABSTRACT

A transfer device for a linear conveyor (1) comprising means for displacing objects (2) along a direction different of the conveying direction (XX') of the conveyor, whereby a pendulum lever (5) is capable of exerting selectively onto the objects a thrust load (E), whereas the pendulum lever is controlled by a rod (11) brought into rotation by a driving assembly (8), whereby the cinematic link between the rod and the lever is a sliding link, in order to enable pivotless evacuation of the objects (2) outside the conveyor.

10 Claims, 5 Drawing Sheets

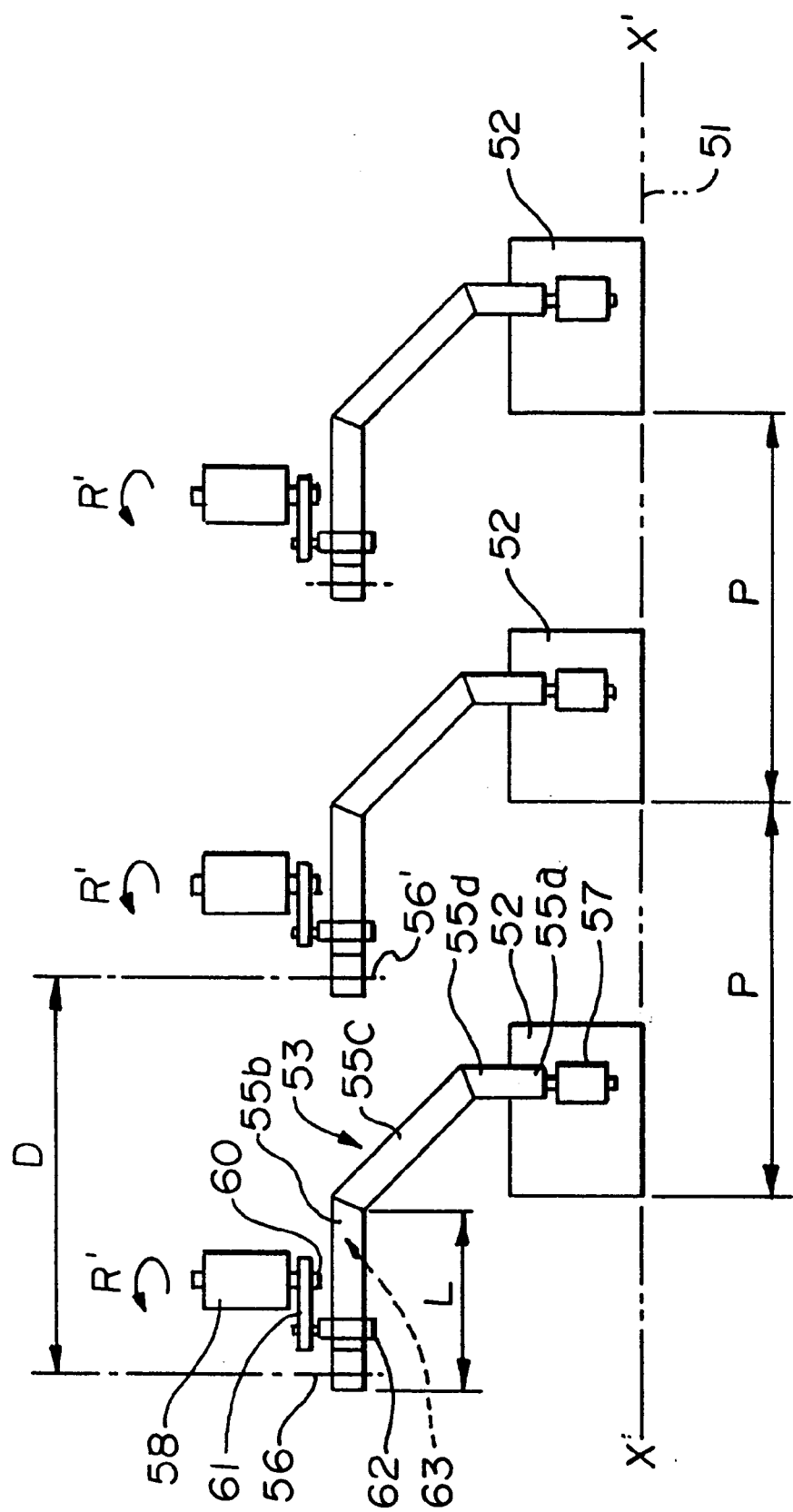

TRANSFER DEVICE AND A CONVEYOR FITTED WITH SUCH A DEVICE

FIELD OF THE INVENTION

The invention relates to a transfer device and to a conveyor fitted with such a device.

In these conveyors used for the transportation of three-dimension objects such as parcels, pushers working in a direction different from that of the conveying direction have been used most often in a linear section of the conveyor, in order to extract the said objects from the conveying direction towards an external zone, for instance towards another, perpendicular, conveyor.

DESCRIPTION OF THE PRIOR ART

Generally, these pushers are arranged on one side of the conveyor, opposite the zone towards which the said objects must be sent, which becomes cumbersome transversally and is often unacceptable.

It is thus quite common that the pushers protrude, sometimes rather significantly, outside the conveyor, onto this transversal side.

Moreover, the actuators of these pushers are generally designed to reverse the pusher's motion upon completion of each stroke, i.e. once the object has been pushed entirely and upon completion of the pusher's retraction with respect to the conveyor.

In both cases, this motion reversion calls for additional pieces of equipment (such as stops and object sensors) in order to stop the motion in 'forward' direction, to respect a fixed point and to initiate the motion in 'return' direction.

Then, the fixed point is reached with little accuracy so that the halting position of the objects is not controlled efficiently.

In this context, let us mention the document DE-U-86 07 794 which describes a pusher designed for directing parcels carried by a first conveyor towards a second conveyor.

The pusher is articulated round a fixed pin located on the first conveyor's side, perpendicular to the conveying direction.

Thus, each object displaced from the first to the second conveyor, undergoes a rotation motion by co-operating with a pusher's end roller.

The document FR-A-1 687 777 describes a dispenser comprising a bowl feeder connected to a track for the supply of parts, whereas three pushers move perpendicular to the track on a crossbeam, without pivoting round a pin.

The document DD-A-30 935 describes a device for separating pressed parts on a circular press. Pushing plates are used to move the parts.

The document GB-A-733 204 describes a conveying system in which a carriage, moving perpendicular to the conveying direction of a worm band, moves the objects perpendicular to this conveying direction, whereas a switch is provided to be actuated by the objects when reaching a stop.

The document FR-A-2 056 305 describes a horizontal pushing device for the displacement of parts, comprising a hydraulic engine driving a toothed wheel thanks to a thread. It has not been designed for transferring a parcel and the angular motion of the shaft is limited to amplitude smaller than one revolution.

The document U.S. Pat. No. 3,246,733 describes a conveying system with several output bands or chutes, opposite which individual pushers have been provided.

SUMMARY OF THE INVENTION

The purpose of the invention is to remedy the shortcomings mentioned above while providing notably a transfer device whose pushing element is driven by an accurate, simple and little cumbersome mechanism, which does not call for reversing the rotation direction and generally without any rotation speed variation.

Thus, the invention allows for a transfer without the object revolving round its axis and without changing the circulation direction of the said object.

The aim is therefore to enable the transfer of the objects outside the conveyor, in fixed and accurately reproducible position, regardless of the mass of the said object.

To this end, it is a first object of the invention to provide a transfer device designed for a linear conveyor such as defined in the claims.

Thanks to the invention, the engine rotation motion is transformed into an angular forward and return motion of a thrust lever. The motion of the lever follows a sine wave curve, uniformly varied with a mechanic acceleration and deceleration upon completion of each forward and return stroke.

This enables transferring the objects significantly faster than with known technologies, for a given conveying speed.

Obviously, according to the situation, the transfer unfurls with the conveyor in operation, slowing down or stopped.

According to a characteristic, the driving mechanism rotates in one direction only, which enables to do away with reversing the rotation direction of the lever's driving mechanism.

According to an embodiment, the lever pivots round a pin which is substantially parallel to the conveying direction, whereby this pin is located above or below the conveyor, whereas the free end of the lever follows a trajectory along an arc of a circle above or below the conveyor.

It is thus quite thinkable that the device should comprise several levers, actuated by a common driving assembly, whereby the control rods of the levers are installed on a common shaft, itself driven by the said assembly.

According to another embodiment, the lever pivots round a pin substantially perpendicular to the conveying direction, whereas the said pin is located above or below the conveyor, whereby the free end of the lever follows a trajectory along an arc of a circle, on a plane substantially horizontal, above or below the conveyor.

For instance, the pin is vertical, i.e. not only perpendicular to the conveying direction, but also intersecting the transfer direction.

In the embodiments, the lever is shaped or is machined in order to reduce the space requirements in the conveying direction, which enables arranging several transfer devices close to one another.

In the case of pins perpendicular to the conveying direction, such as vertical pins, an embodiment sets forth several articulated levers, whereas the length of the section of each lever located substantially at the same height as the corresponding pivot pin, is smaller than the distance between two adjacent pivot pins. This layout eliminates any risk of interference between two close transfer devices.

According to an embodiment, the device comprises means to sense the position of the rod's end, then so-called 'irradiating' rod, actuated at each revolution, upon completion of the return stroke of the rod and connected to an engine control device.

This enables controlling with accuracy the irradiating rod's driving assembly, especially to determine the precise stop position of the pendulum lever, in relation to the displacement of the rod's end.

This system also enables sensing and indicating the lever's retraction close to the conveyor and authorizing its operation or not.

A second object of the invention relates to at least one linear conveyor comprising a transfer device as mentioned, and defined in the claims.

This conveyor functions efficiently and its commissioning and operation costs are relatively low.

DESCRIPTION OF THE DRAWINGS

The invention will be understood more clearly in the light of the following description of two embodiments, given solely for exemplification purposes with reference to the appended drawings on which:

FIG. 7 is a lateral elevation view of a conveyor fitted with several transfer devices such as that of FIG. 6.

DESCRIPTION OF THE PREFERRED EMBODIMENT

Figure 1:
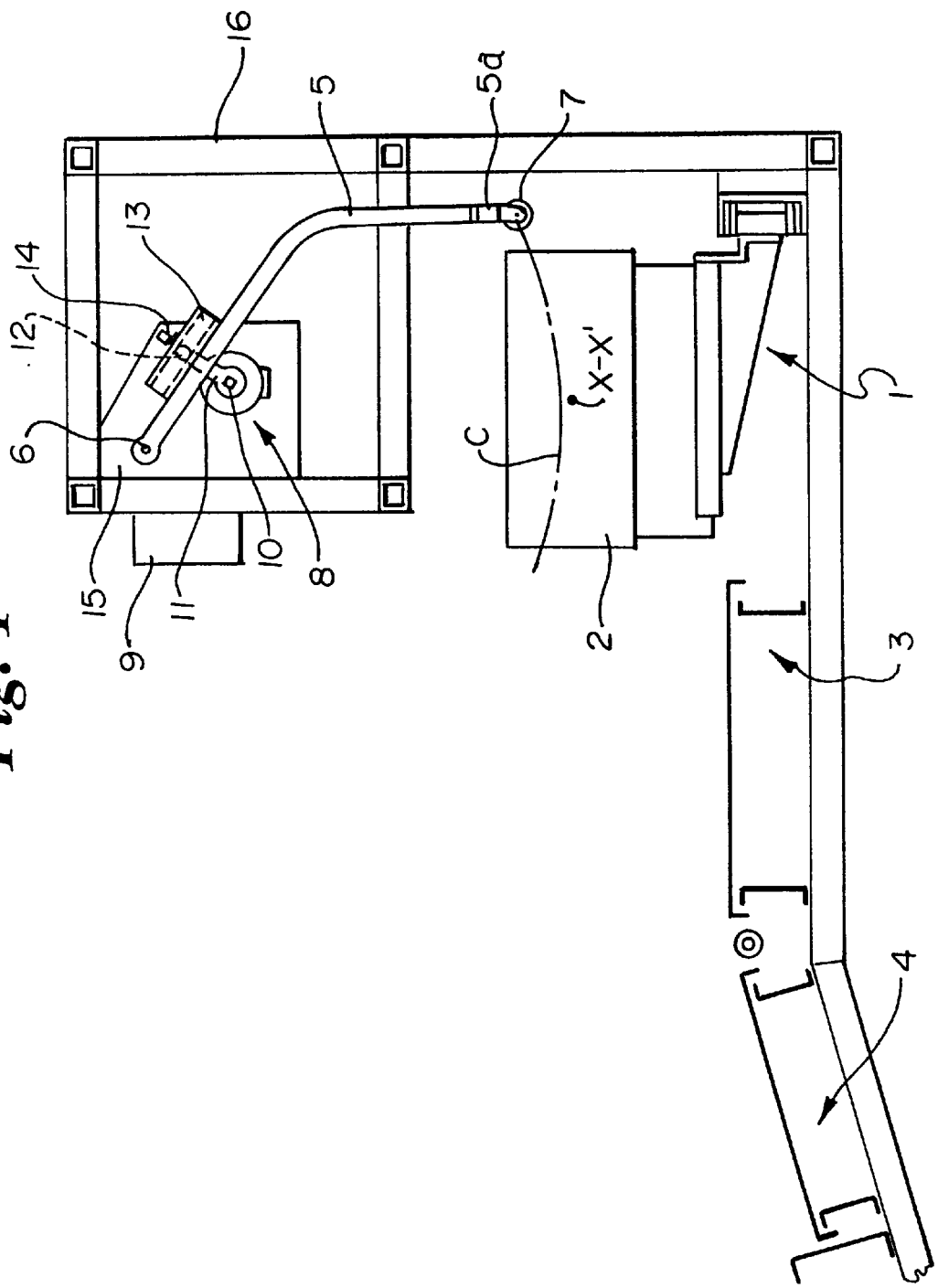
FIG. 1 is an elevation view, perpendicular to a conveying direction, of a conveyor fitted with a transfer device according to the invention in a first standby position.

In FIG. 1, the function of a conveyor 1 is to move three-dimension objects, here parcels 2 in a conveying direction XX' perpendicular to the plane of this figure. Instead of the parcels 2, objects of another nature could be moved as well, wrapped or nor.

Figure 2:
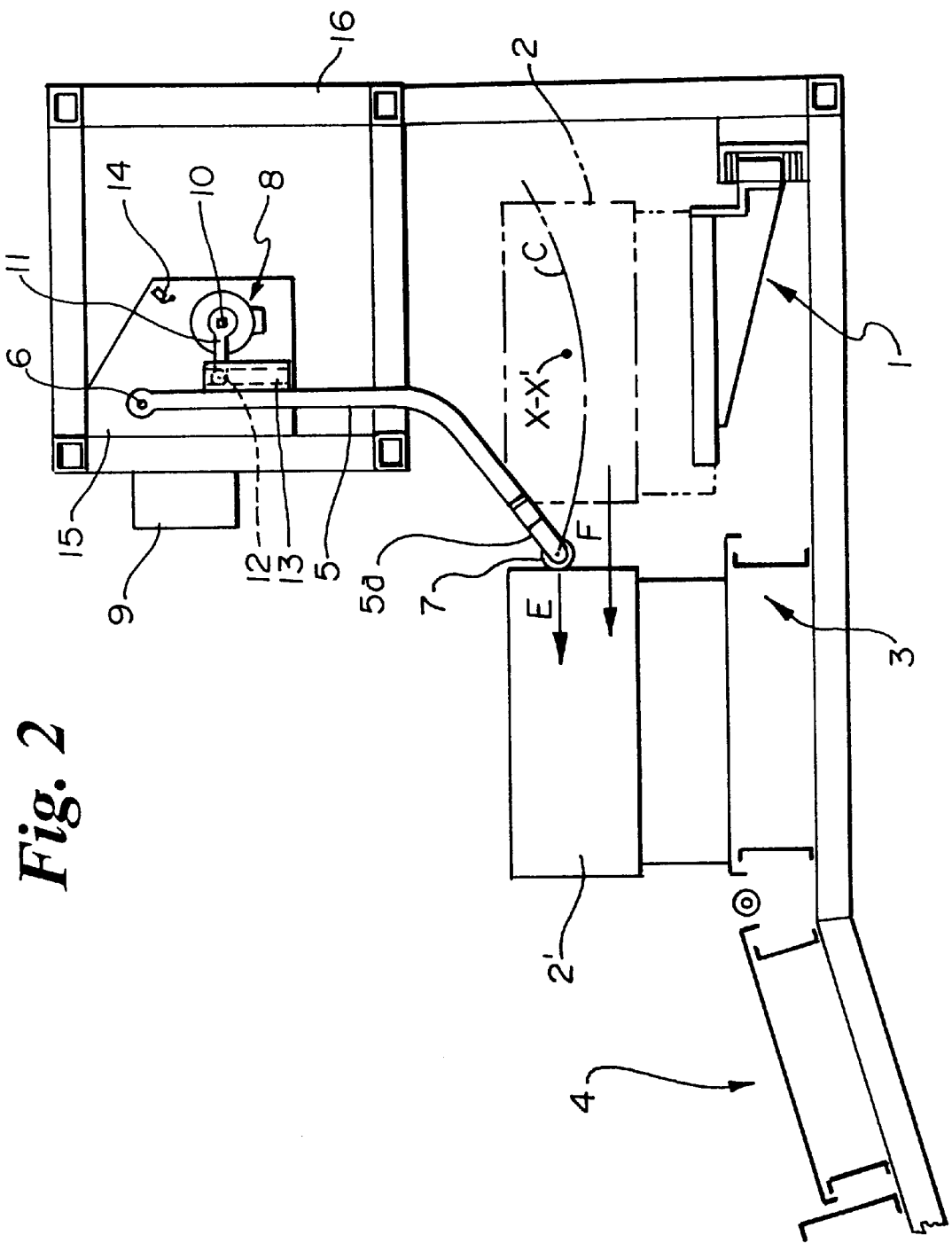
FIG. 2 is a view similar to FIG. 1 whereas the transfer device is in a second position after transferring an object.

It appears that the object 2 is represented in this FIG. 2, before transfer.

A fixed frame 3 is here designed on the side of the conveyor 1 in order to receive a parcel 2' to be transferred to a location 4 described below.

In other embodiments, instead of the fixed frame, a sorting rail or another conveyor can be provided for the reception of the objects from the conveyor.

The orientation of the reception structures 3 is, according to the embodiments, horizontal (i.e. parallel to the transfer and conveying directions), inclined or similar.

A parcel 2' is represented in FIG. 2 during motion along the direction of arrow F, from the conveyor 1 to the location 4, via the frame 3.

It results from the preceding paragraph that, when a parcel 2' is already on the frame 3, pushing the parcel 2 onto 2' evacuates the said parcel onto the location 4.

As was the case for the reception structure or frame 3, the location 4 is replaced, in some embodiments, with a sorting rail.

In another embodiment, the location 4 is fixed.

In another embodiment still, this location 4 is part of a conveyor, enabling for instance along the direction X–X' to evacuate the parcels as they arrive on this conveyor.

As stated above, transfer onto this reception conveyor 4 or from the arrival conveyor 1 of objects 2, is actuated according to the situation when the conveyor 1 or 4 respectively, is operating and hence mobile, or stopped during the said transfer.

In order to pass a parcel 2 from the conveyor 1 onto the frame 3, i.e. in the position 2' in FIG. 2, a lever 5, here, an elbowed lever has been provided, pivoting as a pendulum round a pin 6 substantially parallel to the direction XX'.

This lever is fitted at its free end 5a, here its lower end, with a contact roll 7 designed for exerting a single resting or a thrust load E onto the parcel 2 during transfer.

Other contact pieces are used in other embodiments, such as pads. In other embodiments still, the contact piece is a lever-pivoting shoe, maintained vertical during the movements of the said lever, by a pendulum pantograph.

It should be noted that the load E is substantially parallel to the arrow F and hence substantially perpendicular to the direction XX'.

The lever 5 is driven round the pin 6 by a driving assembly 8, operated by a control unit 9 and fitted with an output shaft 10.

The cinematic link between the output shaft 10 of the assembly 8 and the lever 5 is provided by a rod 11 solid with the shaft 10 and fitted with a roller 12 designed for sliding in a rail 13 installed on the lever 5. The rail 13 is part of the lever 5 in an embodiment that is not illustrated.

A rod/crank-type articulation can thus be obtained.

Figure 3:
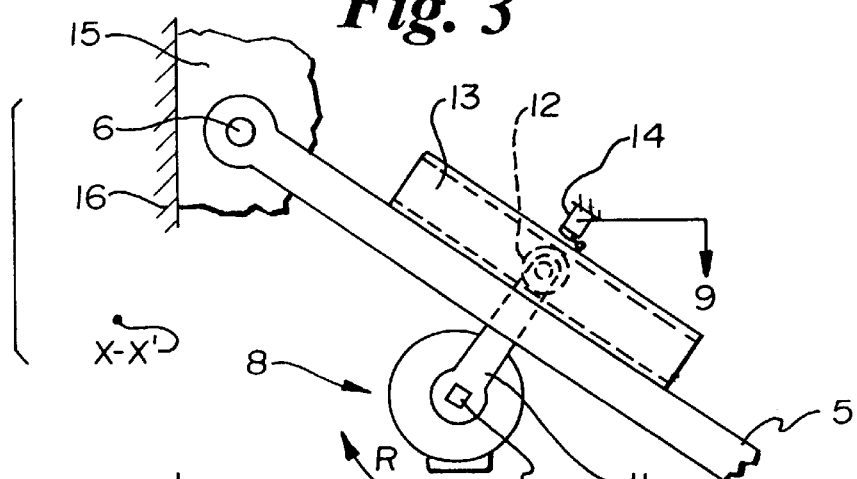
FIG. 3 is an elevation view perpendicular to the conveying direction at greater scale of a portion of the transfer device in the position of FIG. 1.
Figure 4:
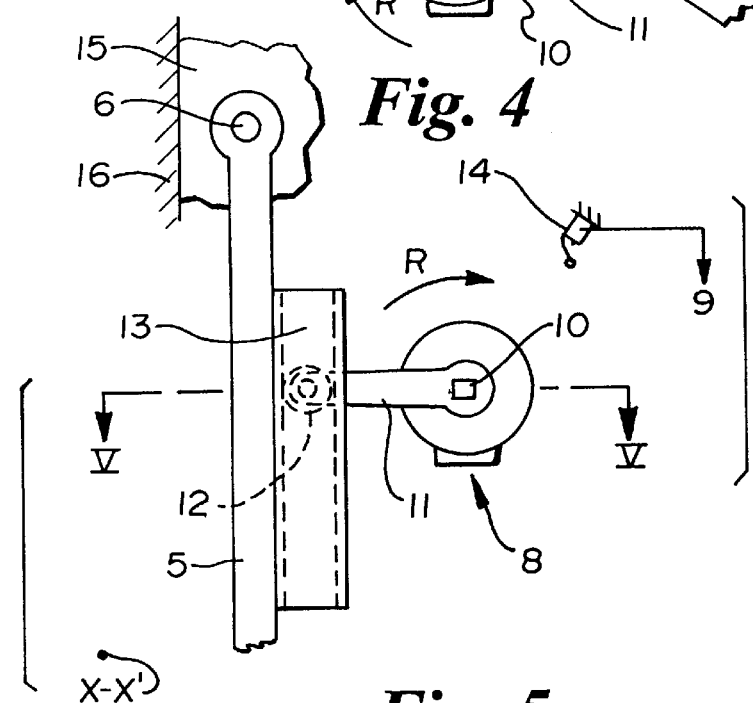
FIG. 4 is a view similar to FIG. 3. whereby the transfer device is in the position of FIG. 2.

The driving assembly 8 is designed to revolve in a single rotation direction represented by the arrow R in FIGS. 3 and 4.

The rotation of the shaft 10 induces a translation motion of the roller 12 inside the rail 13. The effect of this motion is to cause the lever 5 to pivot round the pin 6. This enables to move the end 5a of the lever 5 between the positions in FIGS. 1 and 3 and those in FIGS. 2 and 4 following an arc of a circle C (FIGS. 1 and 2) located in a plane which is here a vertical plane, i.e. substancially perpendicular to the direction XX' and hence in the plane of FIGS. 1 and 2 above the conveyor 1.

It appears clearly that the end 5a switching from its position in FIG. 1 co its position in FIG. 2 enables to transfer the parcel 2 from the conveyor 1 to the frame 3 thanks to the load E exerted by the roll 7 installed on the lever 5.

It also appears that the rod/crank-type articulation enables, without modifying the rotation direction R of the assembly 8, to reverse the motion of the end 5a of the lever 5 in both positions represented.

The acceleration and the deceleration, necessary upon completion of each stroke of the end 5a, are thus provided while the engine rotates in a single direction, here at substantially constant speed.

In other words, an engine revolution corresponds to a forward and return motion of the end 5a of the lever 5, from the first position in FIG. 1 to the second position in FIG. 1, while passing via the position in FIG. 2.

The engine-controlled motion of the assembly 8, operated thanks to the unit 9, enables to have two accurate stop points of the lever s independently of the functional plays.

Thus, an accurate position of the parcel 2 after transfer, with good reproducibility, is obtained without installing precise and costly sensors, still with a simple structure.

It appears from FIGS. 2, 3 and 4, notably, that in the intermediate zone of the arc of a circle C, the speed of the lever 5 is relatively significant, whereas this speed is reduced uniformly towards the end of the stroke until it becomes nil.

The transfer device therefore enables to start rapidly the transfer of the parcels 2 from the conveyor 1 to the frame 3.

And then, when approaching the requested final position of the parcel, the motion speed is dying down, in order to avoid any shocks, notably when the end 5a couches the parcel 2 to be transferred.

Once this position has been reached, this parcel is 'released' at a precise location on the frame 3.

In such a case, the forward time of the pendulum lever 5 (when pushing the object) and its return are proportional to the angle travelled by the rod.

On the embodiment illustrated in FIGS. 1 to 5, the return time is approximately half (for a driven assembly 8 rotating at a substantially constant speed) the forward time. Indeed, the return angle is substantially 120°, and the forward time substantially 240°.

The forward push load is proportional to the action radius of the rod with respect to its pin. The arc C is laid out to obtain a significant load when pushing, before dying down gradually until it almost disappears, close to the release position.

Consequently, when the parcel 2 slides onto the frame 3 and as the speed of the lever 5 is dying down towards the end of the stroke, this parcel 2 is immobilised by its friction against the frame 3 without its own inertia tending to carry it along the arrow F too far towards the location 4.

Besides, it should be noted that the image of the rod's position is that of the pendulum lever 5. There is therefore no electric contact on this lever.

Moreover, according to the objects or parcels to be transferred, for instance in relation to their masses or their frictions against the frame 3, the materials of the frame are selected to ensure accurate and rapid placement.

In an embodiment designed for heavy objects 2, in order to reduce the load E, the frame 3 has been replaced with a rolling place whose rolling coefficient is light.

Figure 5:
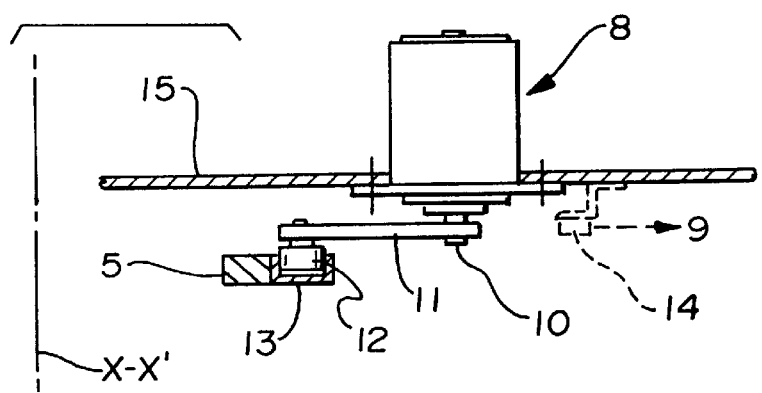
FIG. 5 is a sectional view along the line V—V of FIG. 4.

In order to enable the unit 9 to stop the operation of the driving assembly 8, as shown in FIGS. 3 to 5, a fixed sensor 14 has been provided co detect the course completion, a sensor actuated by the rod 11, at each revolution.

It is not necessary to provide other course completion sensors, notably delineating the position of the object or parcel since the motion reversal of the end 5a in the position in FIGS. 2 and 4 takes place without any particular action of the unit 9.

The sensor 14 used here is relatively inaccurate since the immobilisation irradiating position of the rod 11 corresponds to an inactive position of the lever 5, at return stroke completion.

The driving assembly 8 and the pin 6 are installed on a plate or part 15 supporting the whole transfer device, with the exception of the control unit 9 which is accommodated in a control cabinet close to the conveyor.

Thus, the mechanic components of the transfer device, i.e. the elements 5 to 8, can be installed individually above the conveyor 1 by simply attaching the part 15 on a carrying structure 16.

We can thus obtain a spare modular assembly, comprising the transfer members, among which the lever 5 and its driving assembly 8.

It then suffices co connect logically the sensor 14 to the unit 9 and to power the engine 8 electrically from the unit 9.

This enables easy and rapid maintenance, without any risk of errors in the transfer device. The same goes for its initial installation.

Figure 6:
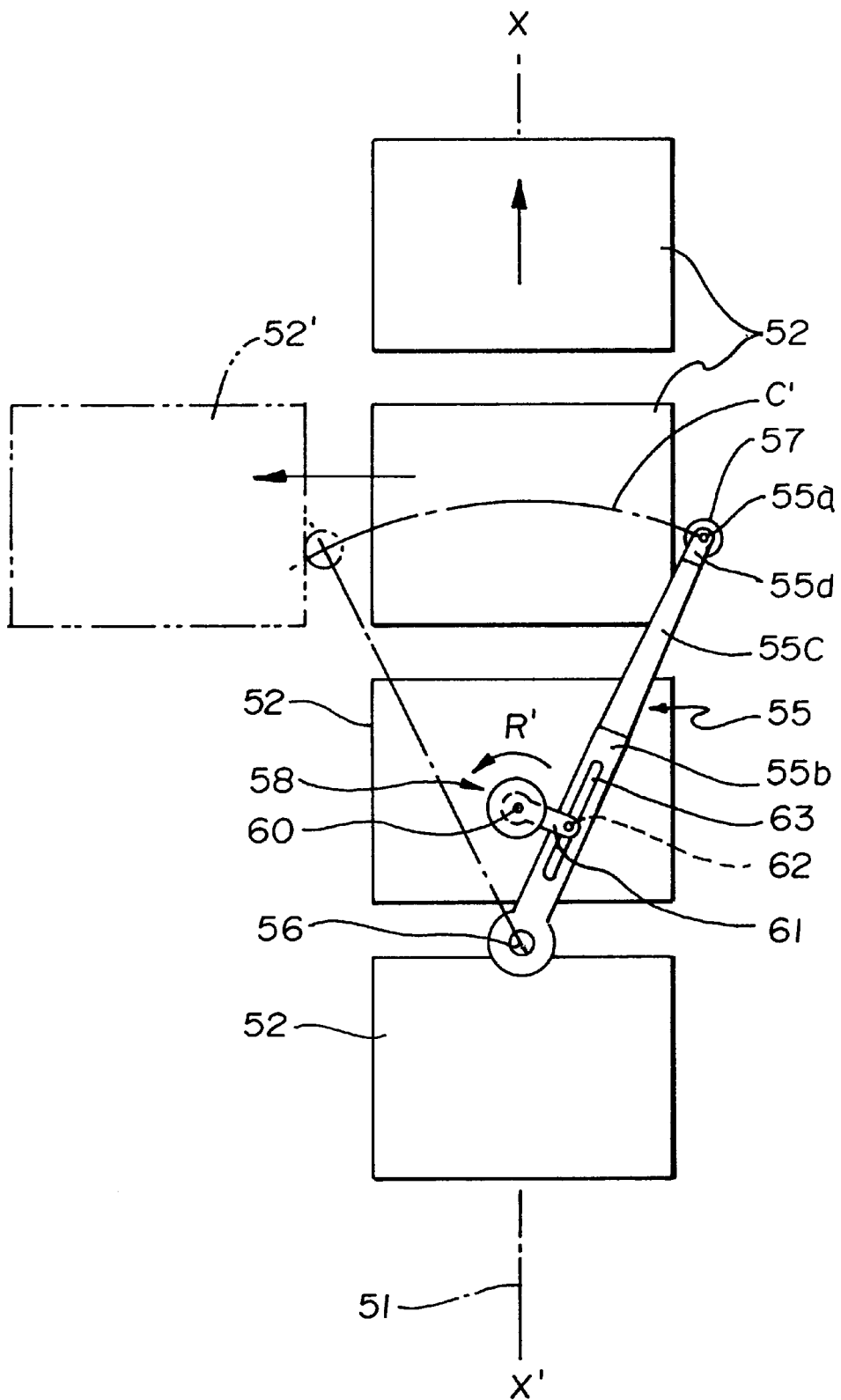
FIG. 6 is a top plane view of a conveyor fitted with a transfer device according to a second embodiment of the invention.

In the second embodiment, represented in FIGS. 6 and 7, the elements similar to those of the embodiment in FIGS. 1 to 5, bear identical references, added the number 50.

In FIG. 6, a conveyor 51 is used to move parcels 52 along a direction XX'.

A lever 55 is articulated round a pin 55 substantially perpendicular to the direction XX' and driven by an assembly 58 to which it is connected by a rod 61. The end of the rod 61 carries a roller 62 designed for sliding in a rail 63 provided in the lever 55.

The rail 63 could also be installed on the lever 55. A contact roll 57 is provided at the free end 55a of the lever 55. Thanks to this arrangement, the free end 55a is mobile in a forward and return motion along an arc of a circle C' whereas the output shaft 60 of the assembly 58 revolves in a single direction represented by the arrow R'.

It appears in FIG. 7 that the lever 55 is elbowed and consists of three sections 55b, 55c and 55d which are substantially rectilinear. In ocher embodiments, the lever 55 takes on another shape as a continuous elbow or bend.

The rail 63 is provided in the globally horizontal section 55b of the lever 55 located substantially at the same height as the pin 56.

FIG. 7 shows a transfer device comprising several pivoting levers 5 with which it is possible to carry the various levers and their associated driving devices with good compactness.

In particular, the length L of the section 55b of each lever 55, located substantially at the same height as the pivot pins 56, is smaller than the distance D between two adjacent pivot pins 56 and 56'.

There is, consequently, no interference between the different levers. This layout enables to farm out the levers 55 by a distance D that is substantially equal to the pitch P of the objects 2 on the conveyor 51.

In an embodiment, several levers 5 or 55 are actuated by a common driving assembly 8 or 58, whereby the control rods of these levers are installed on a common shaft operated by the common driving assembly, via individual motorised couplings, such as electromagnetic or similar couplings, of each transfer lever 5 or 55, to ensure separate control, simultaneous or distinct, of at least one of these levers or of all the said levers.

Although not represented, the devices shown in FIGS. 6 and 7 comprise means to sense the position of the rod's end, similar to those of the first embodiment and a control unit 9.

The invention has been represented whereby the parcels are displaced substantially perpendicular to the conveying direction. It is however applicable when the parcels are displaced in other directions, for example 30 or 45°, with respect to the conveying direction.

The invention has been exposed with pins 6 and 56 located above the conveyor.

Other transfer devices have their pins located below the conveyors. The invention is also applicable while combining the various devices described, nested above and below or not, along a conveyor.

Contrary to the known arrangements, designed for making parcels revolve with a 90° angle round their axes while evacuating the said parcels from a conveyor onto another, embodiments of the invention comprise a vertical pendulum lever whose horizontal pin is placed above or below the routing conveyor of the parcels, which evacuates the parcel along an orthogonal direction.

In the embodiment where the transfer lever is horizontal, its vertical pivot pan can be located for instance above the conveyor, limiting substantially the angular displacement chord of the end of this lever, which authorises, there again, a rotarionless transfer of the parcel provided it is placed between two guides.

What is claimed is:

1. A transfer device designed to be fitted on a linear conveyor capable of exerting selectively on objects a thrust load along a trajectory intersecting a conveying direction of the conveyor, wherein a lever is operated by a rod rotated by a driving assembly via a sliding link between the rod and the lever; wherein the lever pivots around a pin located on a plane comprising substantially the conveying direction and substantially parallel to this direction, at a right angle with respect to the final conveyor, wherein this pin is located vertically offset from the conveyor; while a free end of the lever follows a trajectory along an arc of a circle on a plane, which is vertical and substantially perpendicular to the conveying direction, vertically offset from the conveyor in order to enable pivotless evacuation of the objects outside the conveyor.

2. A transfer device according to claim 1, wherein the driving assembly revolves in one direction only, at substantially constant speed, whereby the rotation of this driving assembly causes a forward and return movement of the free end of the pendulum lever.

3. A transfer device according to claim 1, wherein it comprises several levers actuated by a common driving assembly having control rods; whereas the control rods of these levers are installed on a common shaft operated by the common driving assembly, via individual motorized couplings, of each transfer lever, to ensure separate control, simultaneous or distinct, of at least one lever.

4. A transfer device according to claim 1, wherein the lever comprises an oblong zone for receiving the end of the rod.

5. A transfer device according to claim 1, wherein it comprises detection means for sensing the position of one end of the rod, these detection means being actuated at each revolution upon completion of the return stroke of the rod and are connected to a control device of the driving assembly.

6. A transfer device according to claim 1, wherein the driving assembly is installed above said conveyor.

7. A linear conveyor comprising a transfer device according to claim 1, having at least one lever and a driving assembly, which are installed on a carrying structure with the lever being substantially at a right angle with respect to the conveyor such that the lever protrudes from said conveyor only in the object transfer position.

8. A device designed to be fitted on a linear conveyor capable of exerting selectively on objects a thrust load along a trajectory intersecting a conveying direction of the conveyor, whereby a lever operated by a rod brought into rotation by a driving assembly via a sliding link between the rod and the lever, and pivoting around a pin substantially perpendicular to the conveying direction; wherein that this pin lies substantially at right angle and vertically offset from the conveyor; while a free end of this lever follows a trajectory along an arc of a circle on a plane, which is essentially horizontal and substantially parallel to the conveying direction, and perpendicularly offset from the conveyor in order to enable pivotless evacuation of the objects outside the conveyor.

9. A device according to claim 8, wherein lever is machined and is bent at an angle in order to reduce the space requirements of the device significantly in the conveying direction and perpendicular to this direction.

10. A transfer device according to claim 8, wherein it comprises several pivot levers, whereas the length of the section of each lever, located at the same height as the corresponding pivot pin, is smaller than the distance between two adjacent pivot pins.

* * * * *